United States Patent
Okunaka (10) Patent No.: US 11,826,940 B2
(45) Date of Patent: Nov. 28, 2023

(54) PRODUCTION METHOD FOR FIBER-REINFORCED THERMOPLASTIC RESIN COMPOSITE MATERIAL, PRODUCTION METHOD FOR FIBER-REINFORCED THERMOPLASTIC RESIN TAPE, PRODUCTION METHOD FOR PRESS-MOLDING MATERIAL, PRODUCTION METHOD FOR MOLDED ARTICLE, UNIDIRECTIONAL PREPREG, AND MOLDED ARTICLE

(71) Applicant: Mitsubishi Rayon Co., Ltd., Tokyo (JP)

(72) Inventor: Osamu Okunaka, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 1043 days.

(21) Appl. No.: 15/509,226

(22) PCT Filed: Sep. 17, 2015

(86) PCT No.: PCT/JP2015/076434
§ 371 (c)(1),
(2) Date: Mar. 7, 2017

(87) PCT Pub. No.: WO2016/043258
PCT Pub. Date: Mar. 24, 2016

(65) Prior Publication Data
US 2017/0259459 A1     Sep. 14, 2017

(30) Foreign Application Priority Data

Sep. 17, 2014   (JP) .................................. 2014-188705
Mar. 11, 2015   (JP) .................................. 2015-047983

(51) Int. Cl.
*B29C 48/05*   (2019.01)
*B29B 9/06*    (2006.01)
(Continued)

(52) U.S. Cl.
CPC ................ *B29C 48/05* (2019.02); *B29B 9/06* (2013.01); *B29B 9/14* (2013.01); *B29B 11/16* (2013.01);
(Continued)

(58) Field of Classification Search
CPC ......... B29B 11/16; B29B 15/122; B29B 7/90; B29B 9/06; B29B 9/14;
(Continued)

(56) References Cited

U.S. PATENT DOCUMENTS 3,946,097 A * 3/1976 Takahashi ............... B29C 70/50
264/510
3,993,726 A * 11/1976 Moyer .................. B29B 15/122
264/171.12
(Continued)

FOREIGN PATENT DOCUMENTS

CN   101243121 A   8/2008
CN   101454132 A   6/2009
(Continued)

OTHER PUBLICATIONS

JP2014105266A-MT (Year: 2014).*
(Continued)

*Primary Examiner* — Yunju Kim
(74) *Attorney, Agent, or Firm* — Morgan, Lewis & Bockius LLP (57) ABSTRACT

A production method for a fiber-reinforced thermoplastic resin composite material, the method using a crosshead die (1) that has a maximum aperture height of 1 mm or more, wherein reinforcing fibers are supplied in a reinforcing fiber
(Continued)

bundle to the crosshead die (1), the reinforcing fibers are conjugated with a melted thermoplastic resin, and the conjugate is brought into contact with a pressurization surface that is at or below the solidification temperature of the thermoplastic resin, is pressurized, and is shaped to have a thickness that is 50% or less of the aperture height.

18 Claims, 4 Drawing Sheets

(51) Int. Cl.
| | | |
|---|---|---|
| B29B 9/14 | (2006.01) | |
| B29B 11/16 | (2006.01) | |
| B29C 43/22 | (2006.01) | |
| B29C 48/12 | (2019.01) | |
| B29C 48/16 | (2019.01) | |
| B29C 48/92 | (2019.01) | |
| B29C 70/50 | (2006.01) | |
| B29B 7/90 | (2006.01) | |
| B29B 15/12 | (2006.01) | |
| B29C 48/00 | (2019.01) | |
| B29C 48/04 | (2019.01) | |
| B29C 48/35 | (2019.01) | |
| B29K 101/12 | (2006.01) | |
| B29K 105/08 | (2006.01) | |
| B29K 307/04 | (2006.01) | |

(52) U.S. Cl.
CPC .............. *B29C 43/22* (2013.01); *B29C 48/12* (2019.02); *B29C 48/16* (2019.02); *B29C 48/92* (2019.02); *B29C 70/50* (2013.01); *B29B 7/90* (2013.01); *B29B 15/122* (2013.01); *B29C 48/0011* (2019.02); *B29C 48/04* (2019.02); *B29C 48/35* (2019.02); *B29C 2948/92523* (2019.02); *B29K 2101/12* (2013.01); *B29K 2105/0881* (2013.01); *B29K 2307/04* (2013.01)

(58) Field of Classification Search
CPC .......... B29C 2948/92523; B29C 43/22; B29C 48/0011; B29C 48/16; B29C 48/30; B29C 48/35; B29C 48/92; B29C 70/50; B29K 2101/12; B29K 2105/0881; B29K 2307/04

USPC .................................................... 264/171.13
See application file for complete search history.

(56) References Cited

U.S. PATENT DOCUMENTS

| | | | |
|---|---|---|---|
| 2009/0104418 A1 | 4/2009 | Ohki et al. | |
| 2010/0009158 A1 | 1/2010 | Imaizumi et al. | |
| 2018/0142057 A1* | 5/2018 | Oota | .......................... C08J 5/24 |

FOREIGN PATENT DOCUMENTS

| | | | |
|---|---|---|---|
| EP | 0 325 292 A2 | | 7/1989 |
| EP | 0 170 245 A2 | | 6/2009 |
| JP | 59-062114 A | | 4/1984 |
| JP | 60-036136 A | | 2/1985 |
| JP | 04-244809 A | | 9/1992 |
| JP | 06-270280 A | | 9/1994 |
| JP | 07-024830 A | | 1/1995 |
| JP | 09-155862 A | | 6/1997 |
| JP | 2007-118216 A | | 5/2007 |
| JP | 2007-254718 A | | 10/2007 |
| JP | 2008-049702 A | | 3/2008 |
| JP | 2012-126806 A | | 7/2012 |
| JP | 2014-105266 A | | 6/2014 |
| JP | 2014-105310 A | | 6/2014 |
| JP | 2014105266 A | * | 6/2014 |

OTHER PUBLICATIONS

JPH0724830A-MT (Year: 1995).*
International Search Report dated Dec. 22, 2015, for corresponding International Application No. PCT/JP2015/076434.
Office Action dated May 24, 2016 for corresponding Japanese Patent Application No. 2015-550881.
Office Action dated Oct. 4, 2016 for corresponding Japanese Patent Application No. 2015-550881.
First Office Action issued in corresponding Chinese Patent Application No. 201580049506.4, dated Jul. 2, 2018.
Second Office Action issued in corresponding Chinese Patent Application No. 201580049506.4, dated Apr. 17, 2019.
Chinese Office Action dated Oct. 30, 2019 in corresponding Chinese Application No. 201580049506.4 with English translation.
Chinese Office Action dated Mar. 3, 2020 in corresponding Chinese Application No. 201580049506.4 with English translation.

* cited by examiner

PRODUCTION METHOD FOR FIBER-REINFORCED THERMOPLASTIC RESIN COMPOSITE MATERIAL, PRODUCTION METHOD FOR FIBER-REINFORCED THERMOPLASTIC RESIN TAPE, PRODUCTION METHOD FOR PRESS-MOLDING MATERIAL, PRODUCTION METHOD FOR MOLDED ARTICLE, UNIDIRECTIONAL PREPREG, AND MOLDED ARTICLE

TECHNICAL FIELD

The present invention relates to a production method for a fiber-reinforced thermoplastic resin composite material, a production method for a fiber-reinforced thermoplastic resin tape, a production method for a press-molding material, a production method for a molded article, a unidirectional prepreg, and a molded article.

This application is based upon and claims the benefit of priority of the prior Japanese Patent Application No. 2014-188705 filed in Japan on Sep. 17, 2014 and the prior Japanese Patent Application No. 2015-047983 filed in Japan on Mar. 11, 2015, the entire contents of which are incorporated herein by reference.

BACKGROUND ART

Carbon fibers and carbon fiber composite materials have excellent features such as a high tensile strength and a high tensile modulus of elasticity, excellent heat resistance, chemical resistance, fatigue characteristics, and wear and abrasion resistance, a low coefficient of linear expansion, excellent dimensional stability, and rich electromagnetic wave shielding property and radiolucency so as to be widely applied to sports and leisure, aerospace and space, and general industrial applications. Hitherto, a thermosetting resin such as an epoxy resin has been often used as a matrix of a composite material, but a thermoplastic resin has recently attracted attention from the viewpoint of recyclability and high speed moldability.

Patent Literature 1 discloses a production method to laminate carbon fibers aligned in one direction and a thermoplastic resin. In this method, the carbon fibers are required to be highly aligned in one direction, and it is thus concerned that a problem of fluffs derived from the carbon fiber and the like is caused and it is difficult to improve the line speed.

Patent Literature 2 proposes a fiber-reinforced thermoplastic resin sheet in which the weight content percentage of the reinforcing fiber is 50% or more and 85% or less, the average fiber length of the reinforcing fiber is 5 mm or more and 50 mm or less, and the reinforcing fiber is nondirectionally dispersed in order to keep the fiber length for a long period. In this Patent Literature, although the variation in fiber orientation is not discussed, it is presumed from the production method that there is a variation in fiber orientation on the surface. Hence, it is concerned that there is a problem in securing reliability when being used in practical members. In addition, in Examples of the fiber-reinforced thermoplastic resin sheet, one that is obtained by impregnating a fiber bundle opened in a width of 15 mm or more with a thermoplastic resin in a die and has a width of 10 mm is cut and then formed into a sheet, but the shape of the die and the withdrawing process are not clearly described.

Patent Literature 3 proposes a carbon fiber-reinforced thermoplastic resin tape having a thickness of 130 μm or less. In this production method, the carbon fiber-reinforced thermoplastic resin tape is obtained by opening a carbon fiber with a squeezing bar in a resin bath and impregnating it, and preventing deformation of the tape that the tape is thickened by using a specific nozzle having a slit interval of 130 μm or less and a cooling roller or the like. In this method, a narrow slit interval is required to produce the tape, and in Examples, a tape slightly thicker than the slit nozzle interval is produced. The pressure applied to the slit nozzle is likely to increase when the slit nozzles interval is narrow and it is thus concerned that it is difficult to improve the line speed.

Patent Literature 4 discloses a production method for a thermoplastic unidirectional prepreg sheet in which a plurality of towpregs which are impregnated and formed into a tape shape at the same time are aligned and arranged in the width direction and then formed into a sheet shape by being pressurized under heating. In this method, although it is possible to achieve an increase in speed of the process of forming a sheet, the tape-like towpreg is highly impregnated when being produced and it is thus difficult to achieve an increase in speed.

Examples of Patent Literature 5 discloses a method to obtain a sheet-like product by fabricating an attached product in which nylon 6 is attached to a reinforcing fiber bundle by using a die having a diameter of 1 mm, arranging a large number of this, allowing them to pass between rolls at 250° C. at an interval of 0.3 mm, and allowing them to pass between rolls at 200° C. at an interval of 0.25 mm. However, in this method, the attached product passes between rolls at 250° C. of a higher temperature than the melting point of nylon 6, and it is thus considered that it is not easy to release the attached product.

Patent Literature 6 discloses a method in which an attached product in which a thermoplastic resin is attached to a reinforcing fiber bundle is fabricated and a large number of this are arranged, heated and pressurized by a plate-like material having a heating region and a cooling region to be impregnated with a resin, cooled, and then peeled off. However, in this method, not only the fiber-reinforced thermoplastic resin but also the plate-like material to heat and cool this is required to be repeatedly heated and cooled, and it is thus difficult to achieve an increase in speed. In addition, favorable impregnation is not realized in Comparative Example in which the attached product is pressurized at a roll temperature to be equal to or lower than the melting point.

CITATION LIST

Patent Literature

Patent Literature 1: JP 2014-105310 A
Patent Literature 2: JP 9-155862 A
Patent Literature 3: JP 2007-118216 A
Patent Literature 4: JP 7-24830 A
Patent Literature 5: JP 59-62114 A
Patent Literature 6: JP 60-36136 A

SUMMARY OF THE INVENTION

Problem to be Solved by the Invention

There is a demand for a method for efficiently producing excellent fiber-reinforced thermoplastic resin pressed materials and fiber-reinforced thermoplastic resin tapes, and there is also a demand for a fiber-reinforced thermoplastic resin composite material exhibiting excellent handleability. Particularly, in the fiber-reinforced thermoplastic resin tapes, a method capable of efficiently producing the fiber-reinforced thermoplastic resin tapes with a small number of processes is required from the viewpoint of economical efficiency. In addition, in the fiber-reinforced thermoplastic resin pressed materials, it is easier to reflect the fiber-reinforced thermoplastic resin pressed materials on the part design by decreasing the variation in mechanical properties.

Means for Solving Problem

The present inventors have found out that a fiber-reinforced thermoplastic resin composite material and a fiber-reinforced thermoplastic resin tape which have excellent quality are efficiently obtained by compositing a reinforcing fiber and a thermoplastic resin by a specific crosshead die, then pressurizing the composite material while cooling, and deforming it more than in the prior art, and the inventors have also found out that the fiber-reinforced thermoplastic resin composite material and fiber-reinforced thermoplastic resin tape thus obtained exhibit excellent handleability since the surface thereof is covered with a resin, thereby completing the invention. In other words, the gist of the invention is the following (1) to (15).

(1) A production method for a fiber-reinforced thermoplastic resin composite material, the method including:
  supplying a reinforcing fiber to a crosshead die having a maximum opening height of 1 mm or more in a reinforcing fiber bundle state,
  compositing the reinforcing fiber with a thermoplastic resin in a molten state,
  subsequently bringing the composite material into contact with a pressurization surface at a temperature equal to or lower than the solidification temperature of the thermoplastic resin, and
  shaping the composite material through pressurization to have a thickness to be 50% or less of an opening height.

(2) The production method for a fiber-reinforced thermoplastic resin composite material according to (1), in which a reinforced fiber bundle having a basis weight of 800 mg/m or more and 5000 mg/m or less is used.

(3) The production method for a fiber-reinforced thermoplastic resin composite material according to (2), in which a basis weight R (mg/m) of a reinforcing fiber bundle with respect to a maximum opening height L is represented by $$L > 0.5 \times \mathrm{Log}(R).$$

(4) The production method for a fiber-reinforced thermoplastic resin composite material according to any one of (1) to (3), in which adjacent fiber-reinforced thermoplastic resin composite materials are integrated through pressurization using the crosshead die having a plurality of openings with a pitch interval of 5 mm or more and 40 mm or less.

(5) The production method for a fiber-reinforced thermoplastic resin composite material according to any one of (1) to (4), in which a reinforcing fiber and a thermoplastic resin in a molten state are composited in a crosshead die having an opening with a maximum height of 1 mm or more and 10 mm or less and subsequently shaped to have an average thickness of 0.05 mm or more and 0.4 mm or less by being pressurized.

(6) The production method for a fiber-reinforced thermoplastic resin composite material according to any one of (1) to (5), in which the fiber-reinforced thermoplastic resin composite material is shaped to be 20% or less of an opening height through pressurization.

(7) The production method for a fiber-reinforced thermoplastic resin composite material according to any one of (1) to (6), in which a reinforcing fiber and a thermoplastic resin are composited at 10% by mass or more and 70% by mass or less and 30% by mass or more and 90% by mass or less respectively.

(8) A production method for a fiber-reinforced thermoplastic resin tape, the method including cutting the fiber-reinforced thermoplastic resin composite material obtained by the production method according to any one of (1) to (7) to have a length of 100 mm or more.

(9) The production method for a fiber-reinforced thermoplastic resin tape according to (8), in which a reinforcing fiber and a thermoplastic resin are composited at 20% by mass or more and 70% by mass or less and 30% by mass or more and 80% by mass or less respectively.

(10) A production method for a press-molding material, the method comprising cutting the fiber-reinforced thermoplastic resin composite material obtained by the production method according to any one of (1) to (7) to have a length of 5 mm or more and 50 mm or less.

(11) A production method for a press-molding material, the method including integrating the press-molding material obtained by the production method according to (10) into a sheet shape through heating.

(12) The production method for a press-molding material according to (10) or (11), in which a reinforcing fiber and a thermoplastic resin are composited at 10% by mass or more and 60% by mass or less and 40% by mass or more and 90% by mass or less respectively.

(13) A production method for a molded article, in which
  the molded article is obtained by heating the press-molding material according to any one of (10) to (12) at a temperature equal to or higher than the softening temperature of a thermoplastic resin and then flow press molding the press-molding material, and
  a Cv value of an in-plane fiber orientation coefficient is 20% or less.

(14) A unidirectional prepreg containing a reinforcing fiber aligned in one direction at 20% by mass or more and 70% by mass or less and a thermoplastic resin at 30% by mass or more and 80% by mass or less, in which
  the strength of the unidirectional prepreg by the following 90° bending test is 25% or more and 75% or less of the strength of the thermoplastic resin by a bending test:
  (90° Bending Test)
  the unidirectional prepregs are superposed in the same direction, charged in a mold for press molding that is made of steel and has an outer shape of 230×150×47.5 mm, a cavity of 200×120×1.5 mm at the center, and a thickness of 23 mm from the outer surface to the cavity, moved into a press molding machine set at 250° C. together with the mold, hot pressed at 1 MPa for 11 minutes, then moved into a press machine set at 30° C. together with the mold, and cold pressed at 4 MPa for 3 minutes to form a unidirectional laminate having a thickness of 2 mm, a three point bending test is conducted by using a test piece cut out from the laminate in a direction perpendicular to a fiber to have a length of 100 mm and a width of 25 mm and setting a radius of fulcrum to 2 mm, a radius of indenter to 5 mm, a distance between fulcrums to 80 mm, and a test speed to 5 mm per minute, and a direction perpendicular to a fiber axis is adopted as a result for the 90° bending test.

(15) A press molded article containing a reinforcing fiber at 10% by mass or more and 60% by mass or less and a thermoplastic resin at 40% by mass or more and 90% by mass or less, in which a fiber length of the reinforcing fiber is 5 mm or more and 23 mm or less, a fiber orientation coefficient is 0.15 or more and 0.25 or less on average, and a Cv value of an in-plane fiber orientation coefficient determined on the basis of a result for the following three point bending test is 20% or less:

(Three Point Bending Test)

two sheet-like press-molding materials of 100×120×2 mm are charged in a mold for press molding that is made of steel and has an outer shape of 230×150×47.5 mm, a cavity of 200×120×1.5 mm at the center, and a thickness of 23 mm from the outer surface to the cavity to be superposed, moved into a press molding machine set at 280° C. together with the mold, hot pressed at 1 MPa for 4 minutes and 30 seconds, moved into a press machine set at 80° C. together with the mold, and cold pressed at 4 MPa for 2 minutes to form a molded body of 200×120×2 mm, the same number of a test piece having a length of 100 mm, a width of 25 mm, and a 200 mm direction of the molded body as a machine direction and a test piece having a length of 100 mm, a width of 25 mm, and a 120 mm direction of the molded body as a machine direction are cut out from the molded body, and a three point bending test is conducted in conformity with ISO 178.

Effect of the Invention

It is possible to decrease the shear stress as compared to a die having a narrow slit since it is possible to use a crosshead die having a high opening height, and it is thus possible to increase the line speed and to improve the productivity. Furthermore, it is less concerned that the fiber is broken due to clogging of fluff since the crosshead die does not have a narrow slit portion, the restoration in the case of breakage is also easy, and it is thus possible to decrease the production loss. In addition, it is easy to release the composite material from the pressurizing device and it is possible to increase the speed since the composite material is pressurized while being cooled in this production method.

MODE(S) FOR CARRYING OUT THE INVENTION

The fiber-reinforced thermoplastic resin composite material in the invention is a composite material composed of a reinforcing fiber and a thermoplastic resin, and examples thereof may include a fiber-reinforced thermoplastic resin tape, a fiber-reinforced thermoplastic resin sheet, a press-molding material, and a long fiber pellet. The production method of the invention is particularly applicable to a fiber-reinforced thermoplastic resin tape, a fiber-reinforced thermoplastic resin sheet, and a press-molding material.

The reinforcing fiber to be used in the invention is an inorganic fiber or organic fiber to be used for enhancing the rigidity or strength of a thermoplastic resin. As the reinforcing fiber to be used in the invention, those having a fiber diameter of the single fiber (hereinafter referred to as the "fiber diameter") in a range of 1 μm or more and 50 μm or less are suitable. In a case in which the fiber is too fine, the surface area of the fiber increases and it is thus concerned that the moldability decreases, and in a case in which the fiber is too thick, the aspect ratio of the fiber decreases and it is thus concerned that the fiber is inferior in reinforcing efficiency.

It is preferable to use the reinforcing fiber having the above fiber diameter in a state of a reinforcing fiber bundle since it is difficult to handle the reinforcing fiber as a single fiber. The number of single fibers bundled in a reinforcing fiber bundle is preferably 3,000 or more, more preferably 12,000 or more, and particularly preferably 15,000 or more. In addition, it is preferably 60,000 or less and more preferably 50,000 or less. It is concerned that the production efficiency decreases when the number of single fibers bundled in a reinforcing fiber bundle is too small. It is concerned that the quality decreases as it is difficult for the reinforcing fiber bundle to be impregnated with the thermoplastic resin when it is too large.

The basis weight of the reinforcing fiber bundle is preferably 800 mg/m or more, more preferably 900 mg/m or more, and particularly preferably 1,000 mg/m or more, and it is preferably 5,000 mg/m or less, more preferably 4,000 mg/m or less, and particularly preferably 3800 mg/m. It is concerned that the production efficiency decreases when the basis weight of the reinforcing fiber bundle is too low. It is concerned that the quality decreases as it is difficult for the reinforcing fiber bundle to be impregnated with the thermoplastic resin when it is too high.

In the invention, it is preferable that the basis weight R (mg/m) of the reinforcing fiber bundle with respect to the maximum opening height L is represented by $$L > 0.5 \times \mathrm{Log}(R).$$

When the reinforcing fiber bundle passes through the crosshead die, it is difficult for the reinforcing fiber bundle to pass through the crosshead die when the opening is narrow. In a case in which the reinforcing fiber bundle passes through the crosshead die after the thermoplastic resin is supplied thereto, it is conceivable that the reinforcing fiber bundle is hooked on a piano wire or the like and pulled with the piano wire so as to pass through the crosshead die, but the opening is required to be wide since it is difficult for the overlapped portion of the piano wire and the reinforcing fiber bundle to pass through the crosshead die when the opening is too narrow. Hence, the maximum opening height is required to be higher as the basis weight of the reinforcing fiber bundle is larger.

On the other hand, the fiber bundle can also expand in the width direction of the opening, and the fiber bundle can expand widely particularly when the basis weight of the fiber bundle is large. The investigations have been conducted by taking these into consideration, and as a result, it is concerned that it is difficult for the reinforcing fiber bundle to pass through the crosshead die in a case in which this formula is not satisfied.

It preferable to decrease the basis weight R of the reinforcing fiber bundle in a case in which the maximum opening height L is lower. It is required to narrow the reinforcing fiber bundle in the case of pulling the reinforcing fiber bundle with a piano wire or the like so as to pass through the crosshead die as described above since it is difficult for the overlapped portion of the piano wire and the reinforcing fiber bundle to pass through the crosshead die when the reinforcing fiber bundle is too thick. Hence, it is required to decrease the basis weight of the reinforcing fiber bundle as the maximum opening height is lower. In addition, the reinforcing fiber bundle can expand in the width direction of the opening as well, but it is difficult for the reinforcing fiber bundle to widely expand in a case in which the basis weight of the fiber bundle is small, and it is thus concerned that it is difficult for the reinforcing fiber bundle to pass through the crosshead die in a case in which the formula described above is not satisfied.

The reinforcing fiber is an inorganic fiber or an organic fiber, and it is preferably an inorganic fiber from the viewpoint of the stability at the melting temperature of the thermoplastic resin and the reinforcing efficiency. Examples of the inorganic fiber may include a glass fiber and a carbon fiber, and it is preferably a carbon fiber from the viewpoint of weight saving.

The kind of carbon fiber to be used in the invention is not particularly limited, and any of a PAN-based carbon fiber, (HT, IM, HM), a pitch-based carbon fiber (GP, HM), and a rayon-based carbon fiber can be used, but a PAN-based carbon fiber is preferable.

The reinforcing fiber to be used in the invention preferably has a fiber diameter of 5 μm or more and 15 μm or less. The fiber diameter is even more preferably 5 μm or more and 12 μm or less and particularly preferably 6 μm or more and 8 μm or less. The surface area of the fiber increases when the fiber diameter is too small to be less than 5 μm, and it is thus concerned that the moldability deteriorates. The aspect ratio of the fiber decreases when the fiber diameter is too large to be more than 15 μm, and it is thus concerned that the reinforcing fiber is inferior in reinforcing effect. The fiber diameter of the reinforcing fiber can be measured by using an electron microscope. Examples of the production method for a reinforcing fiber (carbon fiber) having a fiber diameter in the above range may include the methods described in JP 2004-11030 A, JP 2001-214334 A, JP 5-261792 A, and WO 12/050171 A.

As the reinforcing fiber, any fiber reinforcing can be used without being particularly limited as long as it has a fiber diameter described above, a commercially available product may be used, and specific examples thereof may include PYROFIL (registered trademark of Mitsubishi Rayon Co., Ltd.) CF TOW TR50S 6L, TRH50 12L, TRH50 18M, TR50S 12L, TR50S 15L, MR40 12M, MR60H 24P, MS40 12M, HR40 12M, HS40 12P, TRH50 60M, and TRW40 50L (all of them are manufactured by Mitsubishi Rayon Co., Ltd.). TR50S 15L and TRW40 50L are preferable.

In addition, the reinforcing fiber (carbon fiber) is preferably one that is subjected to a surface treatment, particularly an electrolytic treatment. Examples of the surface treatment agent may include an epoxy-based sizing agent, a urethane-based sizing agent, a nylon-based sizing agent, and an olefin-based sizing agent. An epoxy-based sizing agent is preferable. An advantage that the tensile strength and the bending strength are improved is obtained through the surface treatment. A commercially available product may be used as the surface-treated carbon fiber.

As the thermoplastic resin to be used in the invention, any ordinary thermoplastic resin can be used. Examples thereof may include polyamide, polybutylene terephthalate, polyethylene terephthalate, polyphenylene sulfide, polyethylene, polypropylene, and polyacetal as a crystalline resin and polycarbonate, acrylic resin, polystyrene, ABS, polyvinyl chloride, and polyphenylene ether as an amorphous resin. In addition, it is also possible to use two or more kinds of these concurrently. A crystalline resin is preferable from the viewpoint of moldability, and polyamide and polypropylene are preferable from the viewpoint of a balance among the mechanical properties.

In a case in which the fiber-reinforced thermoplastic resin composite material is a fiber-reinforced thermoplastic resin tape, the content percentage of the reinforcing fiber is 20% by mass or more and 70% by mass or less and preferably 30% by mass or more and 60% by mass or less.

The content percentage of the thermoplastic resin is 30% by mass or more and 80% by mass or less and preferably 40% by mass or more and 70% by mass or less (provided that the sum of the reinforcing fiber and the thermoplastic resin is 100% by mass). In other words, it is preferable to supply the reinforcing fiber and the thermoplastic resin to the crosshead die at this proportion and to composite them.

In a case in which the fiber-reinforced thermoplastic resin composite material is a press-molding material, the content percentage of the reinforcing fiber is from 10% by mass to 60% by mass and preferably 15% by mass or 49% by mass or less. The content percentage of the thermoplastic resin is 40% by mass or more and 90% by mass or less and preferably 51% by mass or more and 85% by mass or less (provided that the sum of the reinforcing fiber and the thermoplastic resin is 100% by mass). In other words, it is preferable to supply the reinforcing fiber and the thermoplastic resin to the crosshead die at this proportion and to composite them.

The reinforcing efficiency by the reinforcing fiber decreases and the bending modulus of elasticity and the bending strength thus decrease when the content percentage of the reinforcing fiber is too low, but the moldability deteriorates when it is too high.

It is concerned that the excellent mechanical properties of the thermoplastic resin are impaired and the moldability deteriorates when the content percentage of the thermoplastic resin is too low. In addition, the reinforcing efficiency by the reinforcing fiber decreases and the bending modulus of elasticity and the bending strength decrease when the content percentage of the thermoplastic resin is too high.

Known additives such as a stabilizer, a reinforcing agent, an inorganic filler, an impact modifier, a processing aid, a mold releasing agent, a colorant, carbon black, an antistatic agent, a flame retardant, and a fluoroolefin may be further added to the composite material if necessary. The content percentage thereof varies depending on the kind of the additives, but the additives can be blended if necessary within a range in which the properties of the reinforcing fiber and thermoplastic resin are not impaired, and the content percentage thereof is 20 parts by mass or less and preferably 5 parts by mass or less with respect to 100 parts by mass of the sum of the reinforcing fiber and the thermoplastic resin. It is particularly preferable to contain a mold releasing agent at 0.1 part by mass or more and 0.5 part by mass or less in order to further improve the productivity.

The molten state of the thermoplastic resin means that at least one component constituting the thermoplastic resin is in a molten state, and it means a state in which the thermoplastic resin is softened at a temperature equal to or higher than the melting point in the case of a crystalline resin and the glass transition point in the case of an amorphous resin. It is preferable that the main component constituting the thermoplastic resin is in a molten state.

To composite the reinforcing fiber and the thermoplastic resin means to put the reinforcing fiber and the thermoplastic resin in an attached or impregnated state. For example, a drawing method in the production method for a long fiber pellet and an electric wire coating method are mentioned, but an electric wire coating method is more preferable from the viewpoint of productivity. In the production method of the invention, it is not necessarily required to open the reinforcing fiber before or in the die, and it is possible to appropriately select whether to open the reinforcing fiber or not depending on the impregnated state intended and the productivity. It is possible to lower the porosity by opening the reinforcing fiber in the die from the viewpoint of obtaining a composite material having fewer voids and excellent impregnation quality, and it is preferable not to open the reinforcing fiber before or in the die from the viewpoint of productivity.

The fiber-reinforced thermoplastic resin tape in the invention is a tape composed of a continuous unidirectional reinforcing fiber and a thermoplastic resin. The reinforcing fiber is continuous approximately from one end to the other end of the composite material, and the lengths of the reinforcing fiber and the tape are approximately the same, and for example, the difference between them is within 10%.

In the fiber-reinforced thermoplastic resin tape thus obtained, the surface thereof is covered with a thermoplastic resin and the fiber expands in the width direction. The handleability is favorable as the surface is covered with a thermoplastic resin.

The press-molding material in the invention is a molded material composed of a reinforcing fiber having a length of 5 mm or more and 50 mm or less and a thermoplastic resin. It may have a strip shape or a sheet shape as long as the reinforcing fiber has this length. It has an excellent balance between moldability and mechanical properties as the length of the reinforcing fiber is in this range.

<Crosshead Die>

Figure 1:
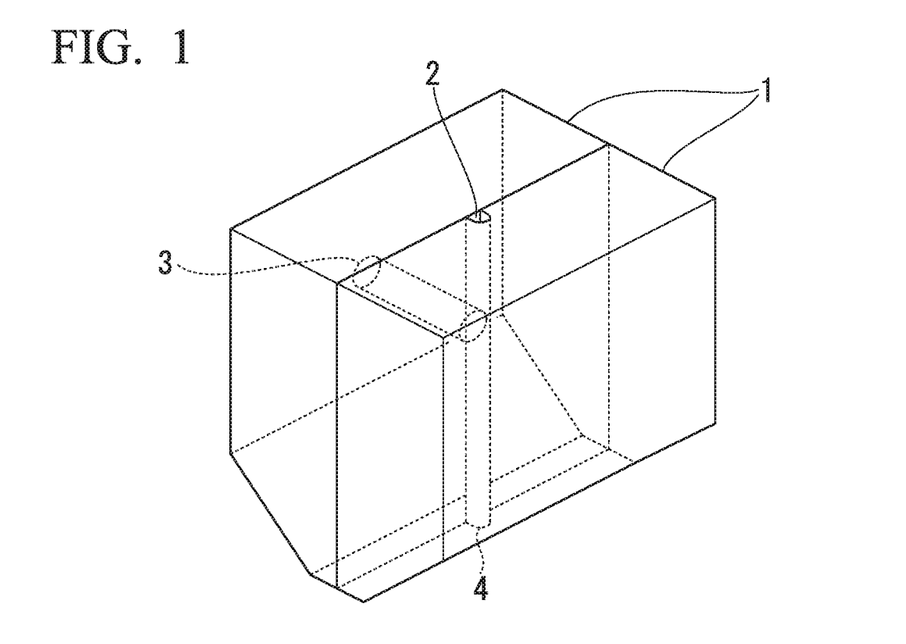
FIG. 1 is a diagram illustrating an example of a crosshead die.

A crosshead die 1 (also simply referred to as the die) to be used here is a die for compositing a thermoplastic resin and a reinforcing fiber, and a resin is supplied to the crosshead die from an extruder or the like while allowing a fiber to pass through the crosshead die and composited with the fiber. For example, a fiber is supplied through one inlet (reinforcing fiber inlet 2), a molten resin is supplied through another inlet (resin inlet 3) present in a direction different from the inlet by 90°, and the fiber and the resin flow together in the interior of the crosshead die to be composited. The fiber-reinforced thermoplastic resin composite material of the invention is obtained by further drawing the composite material through the opening (outlet opening 4) of the crosshead die outlet. An example of the crosshead die is illustrated in FIG. 1.

Figure 2A:
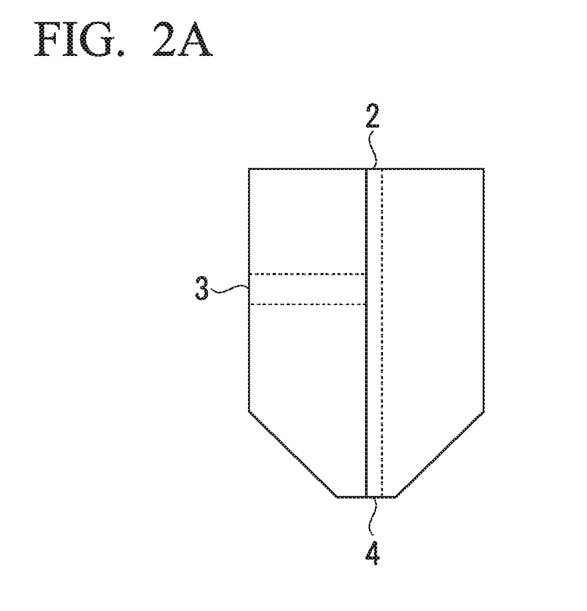
FIG. 2 is a diagram (A: side view, B: bottom view and front view of the opening) illustrating an example of the internal structure of a crosshead die.
Figure 2B:
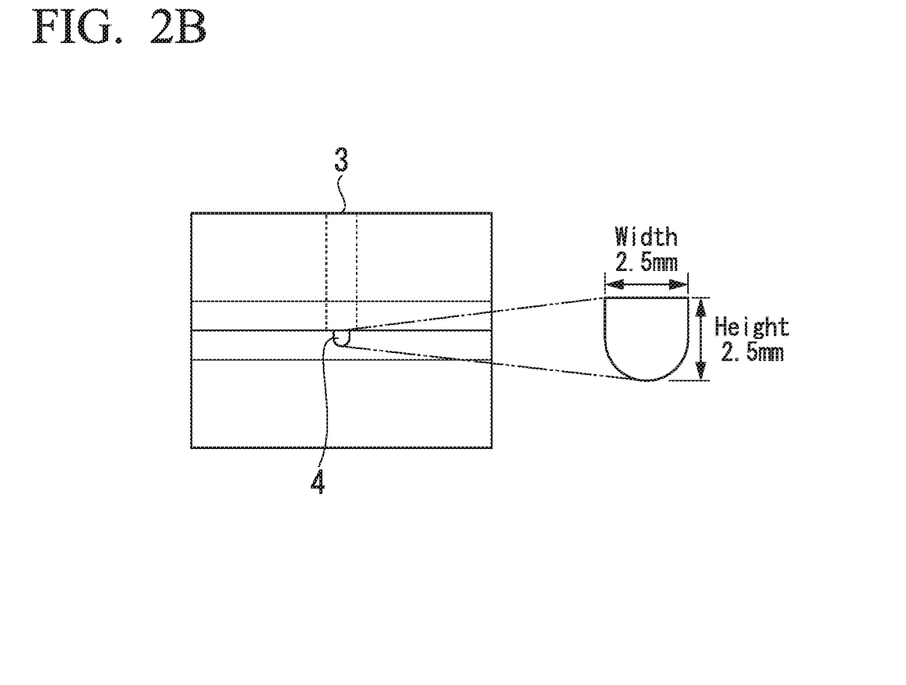

The outlet opening 4 (also simply referred to as the opening) of the invention indicates the opening of the crosshead die outlet provided for drawing the tape. The opening height is the length in the height direction when the outlet opening 4 of the crosshead die 1 is viewed from the front, for example, it is the length in the height direction in a case in which there is a sideways outlet and it means the length in the front-back direction in a case in which there is a downward outlet. In addition, the opening height means the maximum height thereof in a case in which it is not constant. For example, the opening height is the diameter when the opening is a circle.

The height of the outlet opening of the invention is 1 mm or more, preferably 1.5 mm or more, and more preferably 2.0 mm or more. In addition, it is preferably 10 mm or less and more preferably 5 mm or less. It is easier to increase the line speed and it is advantageous from the viewpoint of productivity as the outlet opening height is higher. For example, the apparent shear velocity of the crosshead die 1 having a rectangular opening is inversely proportional to the height of the opening in a case in which the cross-sectional area of the opening is the same, and thus it is possible to decrease the shear stress and it is easier to increase the line speed as the height is higher. In addition, in a case in which the height of the opening is too high, the width is too small when openings having the same cross-sectional area are formed, and it is concerned that it is difficult to shape the composite material to have a thickness to be 30% or less of the opening height.

Although the width of the opening is not particularly specified, it is preferably 50% or more of the maximum opening height and more preferably 100% or more of the maximum opening height. In addition, it is preferably 600% or less and more preferably 400% or less of the maximum opening height. It is easier to design the crosshead die when it is in the preferred range.

<Pressurization>

In the production method of the invention, the composite material is shaped to have a thickness to be 50% or less of the opening height by being pressurized while being cooled after being composited. The composite material is deformed in a direction in which the thickness is thinned and the width is widened by being pressurized after being composited, and the reinforcing fiber is impregnated with the thermoplastic resin and the reinforcing fiber expands in the width direction in the course of deformation.

Figure 3:
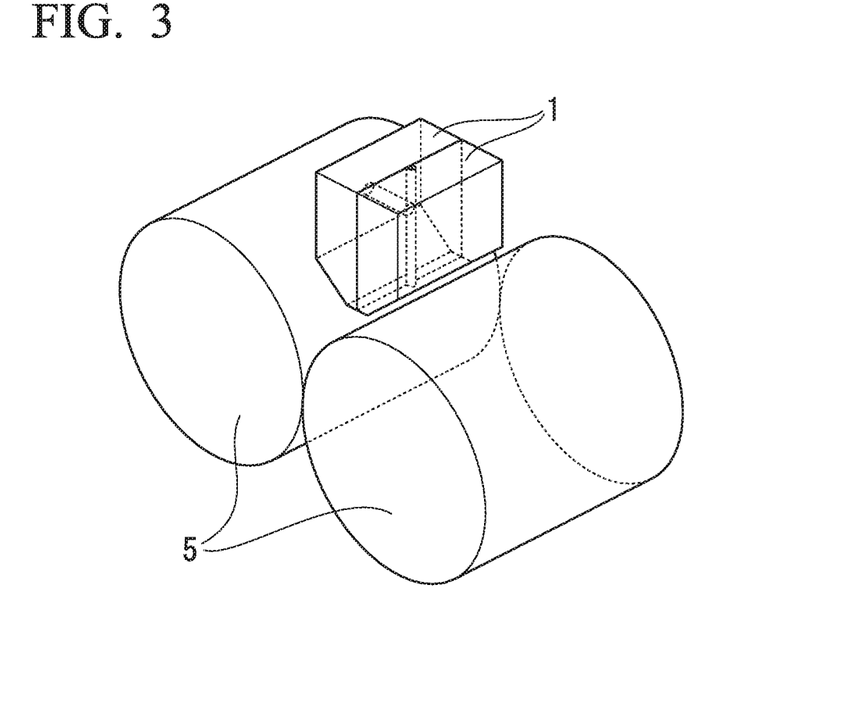
FIG. 3 is a diagram illustrating an example of a positional relation between a crosshead die and a pressure roll.
Figure 4:
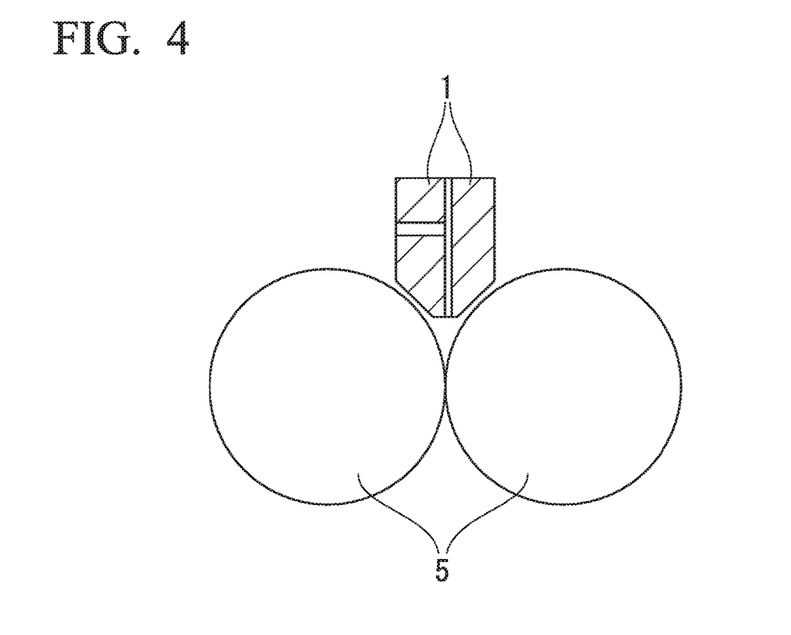
FIG. 4 is a diagram illustrating an example of a positional relation between a crosshead die and a pressure roll.

Pressurization is conducted by a pressurizing device installed behind the crosshead die outlet. Examples of the method of pressurization may include a method to pressurize the composite material with line by a pair of pressure rolls 5 and a method to pressurize the composite material by a surface, but it is preferable to pressurize the composite material by a pair of pressure rolls from the viewpoint of productivity. A mold releasing paper, a mold releasing film, a metal belt, or the like may be used between the pressure roll and the composite material, but it is preferable not to use it. It is easier to miniaturize the production equipment as such a thing is not used.

The portion at which the pressurizing device is in contact with the tape has a temperature lower than the solidification temperature of the thermoplastic resin. The temperature is usually preferably 190° C. or lower and more preferably 120° C. or lower although it depends on the thermoplastic resin to be used. It is easy to release the tape from the pressurizing device as the temperature is in the preferred range. In addition, the thermoplastic resin of the composite material is in a molten state at the outlet of the pressurizing device. It is possible to shape the composite material to have a thickness to be 50% or less of the opening height and to impregnate it as the thermoplastic resin is in the molten state.

In the case of pressurizing the composite material with a line, it is preferable to pressurize the composite material to be completed at a linear pressure of 0.5 kgf/cm or more and 200 kgf/cm or less, the pressure is more preferably 2 kgf/cm or more and 50 kgf/cm or less. It is difficult to shape the composite material when the pressure is too low to be less than 0.5 kgf/cm, and it is concerned that cracking of the composite material occur when the pressure is too high to be more than 200 kgf/cm. In addition, it is also possible to shape the composite material by the equipment which constantly keeps the distance between the pressure rolls in the case of pressurizing the composite material with a pressure roll.

In addition, in the invention, the thickness of the composite material is adjusted to 50% or less of the opening height through pressurization. The thickness is preferably 30% or less and more preferably 20% or less of the opening height. It is possible to obtain a fiber-reinforced thermoplastic resin tape having excellent impregnation quality by adjusting the thickness of the composite material to 50% or less of the opening height. The guide line of the lower limit is 2% or more and preferably 5% or more. It is concerned that it is difficult to shape the composite material to have a thickness to be equal to or less than this.

In the invention, it is preferable to shape the composite material to have a thickness of 0.05 mm or more and 0.4 mm or less. The thickness is preferably 0.1 mm or more and 0.35 mm or less and more preferably 0.15 mm or more and 0.3 mm or less. It is concerned that cracking of the composite material occur to cause a trouble in a case in which the thickness is less than 0.05 mm. It is concerned that impregnation is insufficient when the thickness exceeds 0.4 mm.

<Solidification Temperature of Thermoplastic Resin>

The "solidification temperature of the thermoplastic resin" described above is the crystallization temperature in the case of a crystalline resin and the glass transition temperature in the case of an amorphous resin. It is the solidification temperature of the matrix component of the alloy in a case in which the thermoplastic resin is an alloy composed of a plurality of thermoplastic resins.

In other words, in the case of a compatible alloy, the solidification temperature of the thermoplastic resin is the crystallization temperature when the alloy is crystalline and it is the glass transition temperature when the alloy is amorphous in the same manner as a single resin. In the case of an incompatible alloy, it has a plurality of crystallization temperatures or glass transition temperatures, but it is the solidification temperature of the matrix component (sea component). The solidification temperature of the thermoplastic resin is the crystallization temperature of the matrix component in a case in which the matrix component is a crystalline resin, and it is the glass transition temperature of the matrix component in a case in which the matrix component is an amorphous resin. The matrix component is determined by the quantity ratio or the viscosity ratio, but the component in the most amount is often the matrix component in most industrially available alloys.

The solidification temperature of the thermoplastic resin can be determined by differential scanning calorimetry (DSC). The crystallization temperature can be measured as an exothermic peak and the glass transition temperature can be measured as the temperature at which the baseline shifts by cooling the thermoplastic resin from the temperature at which it sufficiently melts at a rate of 10° C./min.

In the invention, it is possible to use a crosshead die having a plurality of openings. A strand-like fiber-reinforced thermoplastic resin is drawn through each of the plurality of openings and this is integrated with the adjacent fiber-reinforced thermoplastic resin. In this manner, a sheet-like fiber-reinforced thermoplastic resin tape having a wide width is obtained.

The pitch interval of the plurality of openings is preferably 5 mm or more and 40 mm or less. The pitch interval can be roughly determined by the extent to which one fiber bundle is expanded. The pitch interval is preferably equal to or less than the width in which one fiber bundle is expanded and more preferably the width in which one fiber bundle is expanded. It is possible to adjust the fiber to have the intended basis weight as the pitch interval is in this range.

Examples of the reinforcing fiber thermoplastic resin composite material obtained by the production method of the invention may include a unidirectional prepreg which contains a reinforcing fiber aligned in one direction at 20% by mass or more and 70% by mass or less and a thermoplastic resin at 30% by mass or more and 80% by mass or less and of which the strength by the following 90° bending test is 25% or more and 75% or less of the strength of the thermoplastic resin by a bending test.

(90° Bending Test)

Figure 5A:
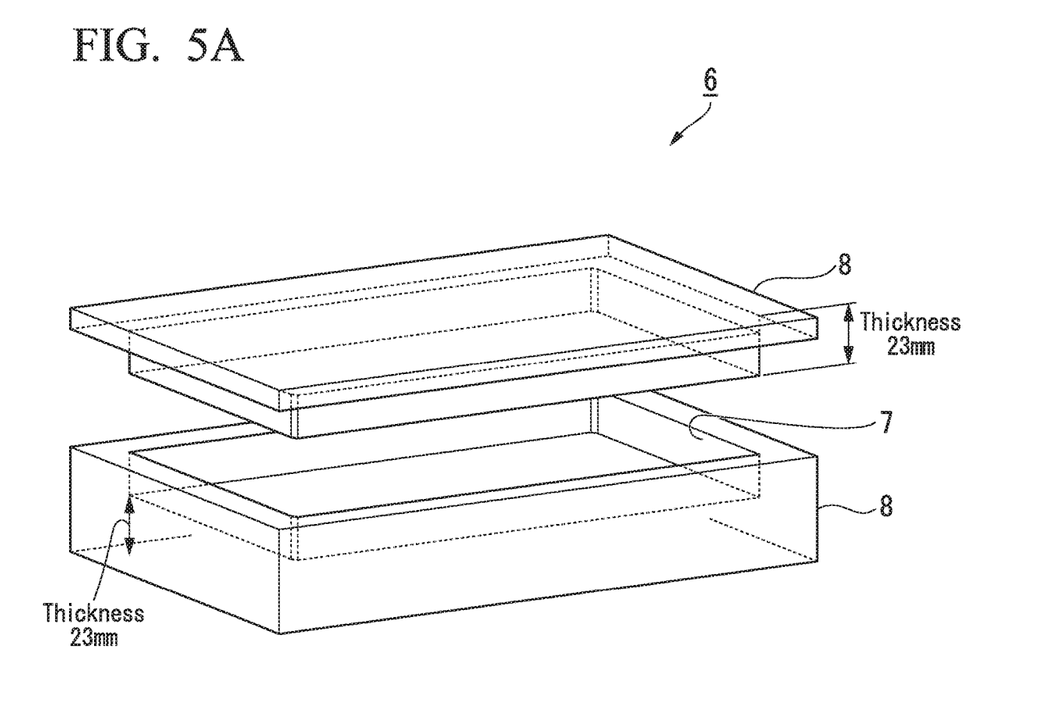
FIG. 5 is a schematic diagram (A: perspective view, B: side view) of a mold used for molding.
Figure 5B:
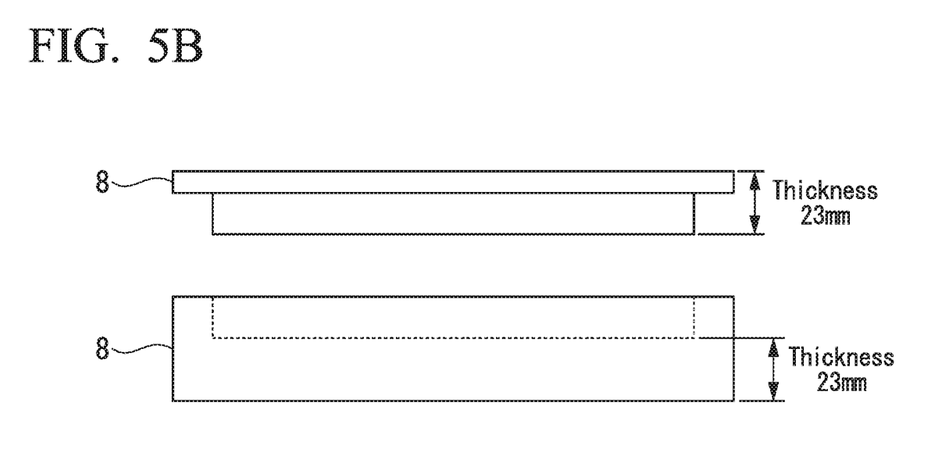

Unidirectional prepregs are superposed in the same direction, charged in a mold for press molding 6 that is made of steel and has an outer shape of 230×150×47.5 mm and a cavity of 200×120×1.5 mm at the center (thickness from the upper end of the outer shape 8 to the cavity 7 is 23 mm, thickness from the lower end of the outer shape 8 to the cavity 7 is 23 mm), moved into a press molding machine set at 250° C. together with the mold, hot pressed at 1 MPa for 11 minutes, moved into a press machine set at 30° C. together with the mold, and cold pressed at 4 MPa for 3 minutes to form a unidirectional laminate having a thickness of 2 mm.

The three point bending test is conducted by one cut out from the laminate in the direction perpendicular to the fiber to have a length of 100 mm and a width of 25 mm and setting the radius of fulcrum to 2 mm, the radius of indenter to 5 mm, the distance between fulcrums to 80 mm, and the test speed to 5 mm per minute, and the direction perpendicular to the fiber axis is adopted as the result for the 90° bending test.

The unidirectional prepreg is one obtained by impregnating a reinforced fiber aligned in one direction with a thermoplastic resin. The reinforcing fiber may be completely or partially impregnated with the thermoplastic resin. Those that are completely impregnated exhibit higher mechanical properties, but those that are partially impregnated are preferable from the viewpoint of production efficiency. Those that are partially impregnated are preferable to take the production efficiency seriously particularly in the case of reheating the unidirectional prepreg for press molding or the like in a later process. The unidirectional prepreg is inferior in handleability in the case of not being impregnated at all.

The "strength by the 90° bending test described above" of the unidirectional prepreg of the invention is preferably 30% or more and 60% or less of the strength of the thermoplastic resin by a bending test.

The "bending test of thermoplastic resin" in the 90° bending test described above is the method described in ISO 178. In other words, a test piece which is obtained by injection molding and has a length of 80 mm, a width of 10 mm, and a thickness of 4 mm is subjected to the three point bending test at a radius of fulcrum of 5 mm, a radius of indenter of 5 mm, a distance between fulcrums of 64 mm, and a test speed of 2 mm per minute.

The fiber-reinforced thermoplastic resin tape of the invention is suitable for use as a laminate, and for example, it is widely utilized in enclosures and parts of electrical and electronic machines such as personal computers, office automation equipment, audio visual equipment, and home appliances and in automobile parts.

In the invention, it is possible to produce a strip-like press-molding material by cutting the fiber-reinforced thermoplastic resin composite material obtained by the production method for a fiber-reinforced thermoplastic resin composite material described above to have a length of 5 mm or more and 50 mm or less.

The strip-like press-molding material in the invention is a material which can be shaped by being heated at a temperature equal to or higher than the softening temperature of the thermoplastic resin, and it is possible to obtain a desired molded article by weighing, heating, and subjecting the strip-like press-molding material to press molding. It is possible to quantitatively supply the press-molding material for press molding by weighing a large number of press-molding materials for a molded article.

Examples of the method for cutting the composite material of the invention may include a method using a side cut type pelletizer, a method using a drum type cutter, and a method using a guillotine type cutter. Among these, a method using a side cut type pelletizer is preferable. It is possible to decrease the wrong cut that the composite material is not cut to have a desired length by using a side cut type pelletizer.

The cutting length is preferably 5 mm or more and 23 mm or less, more preferably 10 mm or more and 20 mm or less, and even more preferably 15 mm or more and 18 mm or less. The mechanical properties such as a bending strength increase when the cutting length is 5 mm or more. In addition, it is possible to lower the Cv value of the fiber orientation coefficient when it is 23 mm or less.

The surface area of one piece of the strip-like pressed material thus obtained is 200 mm$^2$ or more and 1200 mm$^2$ or less and preferably 300 mm$^2$ or more and 600 mm$^2$ or less. The mechanical properties such as a bending strength increase when the surface area is 200 mm$^2$ or more. It is possible to lower the Cv value of the fiber orientation coefficient when it is 1200 mm$^2$ or less.

It is possible to obtain a sheet-like press-molding material by heating the strip-like press-molding material described above at a temperature equal to or higher than the softening temperature of the thermoplastic resin for integration.

In the invention, the "temperature equal to or higher than the softening temperature" is a temperature at which at least a part of the thermoplastic resin constituting the press-molding material softens, a temperature equal to or higher than the glass transition temperature of the thermoplastic resin is required, and a temperature equal to or higher than the melting point is preferable in the case of a crystalline resin. The strip-like press-molding material can be integrated as at least the surface thereof softens.

To integrate the press-molding material through heating means that the strip-like press-molding material is integrated into a sheet shape to an extent to which each piece of the press-molding material does not fall by its own weight, for example, when a sheet-like press-molding material is lifted at 25° C., and it is to facilitate handling.

For example, a method to continuously heat and cool the pressed material by a belt press after depositing a thin piece thereof, a batch method using heating and cooling press, and a method to heat the pressed material deposited by using an infrared heater are conceivable. It is preferable to extrude the air between the respective pieces through pressurization when integrating the pressed material through heating.

The molded article of the invention is obtained by flow press molding. Flow press molding is a method to obtain a molded article having a projected area wider than the projected area of the press-molding material by allowing the press-molding material to flow. The area of the molded article with respect to the projected area of the press-molding material is preferably 150% or more and 400% or less and more preferably 180% or more and 300% or less. It is possible to decrease variations in mechanical properties such as a bending strength and a bending modulus of elasticity when the area is within the preferred range.

Examples of the method of flow press molding may include heating and cooling press and stamping molding. The heating and cooling press is a method in which a press-molding material is charged in a mold, shaped by any of heating press and cooling, heating and cooling press, or heating press and cooling press, and taken out from the mold. Stamping molding is a method in which the press-molding material is heated in advance, then charged in a mold, and press molded to obtain an intended molded article.

The in-plane fiber orientation coefficient represents the contribution ratio of the fiber to the measurement axis with respect to the plane, and it is within a range of 0 or more and 1 or less. It can be directly determined by measuring the orientation of fibers by X-ray CT or image analysis of the surface. In addition, it can also be determined by determining to what extent the fiber contributes to that direction from the mechanical properties such as the tensile modulus of elasticity and the bending modulus of elasticity of the composite material.

The fiber orientation coefficient determined by these methods varies depending on the measuring method, for example, by the influence of the fiber length, the orientation in the thickness direction, and the like, but any method may be used. In the invention, the variation in fiber orientation coefficient is required to be small.

The Cv value of the fiber orientation coefficient is 20% or less and preferably 15% or less. It is easier to keep the performance of the molded article within a certain range as the Cv value is within this range.

A press molded article which contains a reinforcing fiber at 10% by mass or more and 60% by mass or less and a thermoplastic resin at 40% by mass or more and 90% by mass and in which the fiber length of the reinforcing fiber is 5 mm or more and 23 mm or less, the fiber orientation coefficient is 0.15 or more and 0.25 or less on average, and the Cv value of the in-plane fiber orientation coefficient is 20% or less can be obtained by the production method for a press molded article described above.

(Press Molding and Cutting)

In the mold for press molding 6 that is made of steel and has an outer shape of 230×150×47.5 mm and a cavity of 200×120×1.5 mm at the center (thickness from the upper end of the outer shape 8 to the cavity 7 is 23 mm, thickness from the lower end of the outer shape S to the cavity 7 is 23 mm), two sheet-like press-molding materials of 100×120×2 mm are charged to be superposed, moved into a press molding machine set at 280° C. together with the mold, hot pressed at 1 MPa for 4 minutes and 30 seconds, moved into a press machine set at 80° C. together with the mold, and cold pressed at 4 MPa for 2 minutes to obtain a molded body of 200×120×2 mm flowed to have an area enlarged two times.

The same number of a test piece having a length of 100 mm, a width of 25 mm, and a 200 mm direction of the molded body as a machine direction and a test piece having a length of 100 mm, a width of 25 mm, and a 120 mm direction of the molded body as a machine direction are cut out from the molded body and subjected to the three point bending test in conformity with ISO 178.

In the invention, the bending modulus of elasticity of each test piece is determined by the method described in the (press molding and cutting) above, and the fiber orientation coefficient of each test piece is calculated by the following Equation 1.

$$E = \eta_0 \cdot E_f V_f + E_m(1-V_f) \quad \text{(Equation 1)}$$

that is, $\eta_0 = (E - E_m(1-V_f))/(E_f V_f)$.

E: modulus of elasticity of composite material (GPa)
Ef: modulus of elasticity of fiber (GPa), 240 in the present Example
Em: modulus of elasticity of resin (GPa), 2 in the present Example
Vf: volume content percentage of fiber (–)
provided that Vf is determined using the following Equation 2.

$$W_f = V_f \rho_f / (V_f \rho_f + (1-V_f) \rho_m) \quad \text{(Equation 2)}$$

Wf: mass content percentage of fiber (–)
ρf: density of fiber (g/cm$^3$), 1.82 in the present Example
μm: density of resin (g/cm$^3$), 1.14 (polyamide) in the present Example The average value and standard deviation of the fiber orientation coefficient thus obtained are determined, and the standard deviation is divided by the average value to calculate the Cv value of the fiber orientation coefficient.

$$Cv \text{ value (\%)} = \text{standard deviation/average value} \times 100 \quad \text{(Equation 3)}$$

In the invention, it is possible to stably obtain a molded article having excellent mechanical properties and to widely utilize the molded article in, for example, enclosures and parts of electrical and electronic machines such as personal computers, office automation equipment, audio visual equipment, and home appliances and in automobile parts.

EXAMPLES

Hereinafter, the invention will be described in more detail with reference to Examples. Incidentally, the terms "parts" and "%" in the following description mean "parts by mass" and "% by mass" unless otherwise stated.

Impregnated state: the impregnated state was confirmed by observing the cross section of the tape.

A: those in which most of fibers in the interior are covered with resin. Porosity is approximately 2% or less.

B: those in which approximately half or more of fibers in the interior are covered with resin.

C: those in which obvious core-sheath structure is observed and most of fibers are not covered with resin.

[Raw Materials]

Nylon resin (A-1): nylon 6 UBE nylon 1015B (manufactured by UBE INDUSTRIES, LTD., medium viscosity), crystallization temperature: 171° C.

Polypropylene resin (A-2): one prepared by blending polypropylene resin NOVATECH-PP MA04A (manufactured by Japan Polypropylene Corporation) with acid-modified polypropylene resin UMEX 1001 (manufactured by Sanyo Chemical Industries, Ltd.) at 95% and 5%. Crystallization temperature: 133° C.

Carbon fiber (B): PYROFIL CF TOW TR50S 15L (manufactured by Mitsubishi Rayon Co., Ltd., treated with epoxy-based sizing agent, basis weight: 1,000 mg/m, tensile strength: 4,900 MPa, tensile modulus of elasticity: 240 GPa, fiber diameter: 7 μm)

Mold releasing agent (C): dipentaerythritol stearate

Example 1

The nylon resin (A-1) was supplied to a 30φ twin screw extruder at a rate of 0.83 kg/h by using a metering feeder, plasticized at 250° C., supplied to a vertical wire coating die set at 280° C., and composited with the carbon fiber (B). The die outlet (outlet opening 4) has a height of 2.5 mm and a width of 2.5 mm, and the die is one for one having a shape in which a semicircle having a height of 1.25 mm, a width of 2.5 mm, and a diameter of 2.5 mm and a rectangle having a height of 1.25 mm and a width of 2.5 mm are combined in the height direction.

The composite strand was allowed to pass between the two metal pressure rolls 5 which had a diameter of 100 mm and in which water at 30° C. was circulated to be crushed. The pressurizing force of the pressure roll 5 was adjusted to 31 kgf. The pressure roll was installed immediately below the die outlet (outlet opening), and the position thereof was adjusted so that upper 40 mm of the center of the two pressure rolls became the die outlet. The pressure roll was driven in the direction to withdraw the strand at a peripheral speed of 20 m/min.

Those withdrawn by the metal pressure roll were pulled by hand and peeled off to obtain a tape composed of a nylon resin and a carbon fiber. The thickness of the tape thus obtained is 0.3 mm, and the ratio of carbon fiber calculated from the charged quantity is 59%. In addition, in the tape thus obtained, the fiber was expanded in the width direction and the surface was covered with the resin.

Example 2

Example 2 was carried out in the same manner as in Example 1 except that the pressurizing force was adjusted to 5 kgf. The thickness of the tape thus obtained was 0.4 mm, the fiber was expanded in the width direction in the tape, and the surface thereof was covered with the resin.

Example 3

Example 3 was carried out in the same manner as in Example 1 except that the quantity of the nylon resin supplied was set to 2.23 kg/h. The ratio of carbon fiber calculated from the charged quantity is 35%. The thickness of the tape thus obtained was 0.2 mm, the fiber was expanded in the width direction in the tape, and the surface thereof was covered with the resin.

Example 4

Example 4 was carried out in the same manner as in Example 3 except that 99.75 parts of the nylon resin (A-1) and 0.25 part of the mold releasing agent (C) were used instead of 100 parts of the nylon resin (A-1). The ratio of carbon fiber calculated from the charged quantity is 35%, and releasing of the tape from the pressure roll 5 was extremely easy. The thickness of the tape thus obtained was 0.2 mm, the fiber was expanded in the width direction in the tape, and the surface thereof was covered with the resin.

Example 5

Example 5 was carried out in the same manner as in Example 4 except that the quantity of nylon resin (A-1) and mold releasing agent (C) supplied was 5.6 kg/h, the pressurizing force of the roll was 50 kgf, and a die which had a pitch interval of 10 mm (die outlet interval: 7.5 mm) and was capable of forming two strands was used. The die outlet has a height of 2.5 mm and a width of 2.5 mm, and the die is one having two shapes in which a semicircle having a height of 1.25 mm, a width of 2.5 mm, and a diameter of 2.5 mm and a rectangle having a height of 1.25 mm and a width of 2.5 mm are combined in the height direction. The thickness of the tape thus obtained was 0.3 mm, and the two strands were fused with each other to be a single tape having a width of 20 mm. In the tape thus obtained, the fiber was expanded in the width direction, and the surface was covered with the resin.

One prepared by cutting the tape thus obtained to have a length of 295 mm and arranging the cut tapes in a width of about 300 mm without gaps was sandwiched between stainless steel plates, heated at 250° C. for 5 minutes, and cooled at 30° C. for 2 minutes to obtain a unidirectional prepreg.

The unidirectional prepregs thus obtained were superposed in eight layers in the same direction, hot pressed at 250° C. and 1 MPa for 11 minutes in the mold for press molding 6 having a cavity 7 of 300×300 mm, and cold pressed at 30° C. and 4 MPa for 3 minutes to obtain a unidirectional laminate. A test piece cut out from this laminate was subjected to a bending test. The direction along the fiber axis of the surface layer was adopted as 0° and the direction perpendicular to the fiber axis was adopted as 90°, and the measurement results are presented in Table 2.

Example 6

Example 6 was carried out in the same manner as in Example 5 except that the unidirectional prepreg was superposed in eight layers so that the direction of fiber was 0, 90, 90, 0, 0, 90, 90, and 0 degree to obtain a cross-laminated laminate. A test piece cut out from this laminate was subjected to a bending test. The direction along the fiber axis of the surface layer was adopted as 0° and the direction perpendicular to the fiber axis was adopted as 90°, and the measurement results are presented in Table 2.

Example 7

Example 7 was carried out in the same manner as in Example 6 except that a slit prepreg in which the unidirectional prepreg was notched at an angle of 45° with respect to the fiber axis so as to have a fiber length of 25 mm was used instead of the unidirectional prepreg to obtain a laminate composed of discontinuous fibers having a fiber length of 25 mm. A test piece cut out from this laminate was subjected to a bending test. The direction along the fiber axis of the surface layer was adopted as 0° and the direction perpendicular to the fiber axis was adopted as 90°, and the measurement results are presented in Table 2.

Comparative Example 1

Comparative Example 1 was carried out in the same manner as in Example 1 except that pressurization by a nip roll was not conducted but the strand was brought into contact with only the pressure roll on one side. The thickness of the tape thus obtained was 0.6 mm, the tape was elliptical.

Example 8

To a die capable of forming 12 strands (the die outlet (outlet opening) has a pitch interval of 10 mm, a height of 2 mm, and a width of 2 mm, and the die have 12 shapes in which a semicircle having a height of 1 mm, a width of 2 mm, and a diameter of 2 mm and a rectangle having a height of 1 mm and a width of 2 mm are combined in the height direction), the polypropylene resin (A-2) was supplied from the transverse direction at a rate of 1.1 kg/h from a single screw extruder set at 250° C., and the carbon fiber (B) preheated by an IR heater set at 300° C. was supplied from the upper part, and the polypropylene resin (A-2) and the carbon fiber (B) were composited at the die temperature of 320° C. The composite strand was allowed to pass between two metal pressure rolls 5 which had a diameter of 100 mm and in which the heat medium at 100° C. was circulated to be crushed. The pressurizing force of the pressure roll 5 was adjusted to 300 kgf. The pressure roll was installed immediately below the die outlet, and the position thereof was adjusted so that upper 50 mm of the center of the two pressure rolls became the die outlet. The pressure roll was driven in the direction to withdraw the strand at a peripheral speed of 2.5 m/min.

The thickness of the unidirectional prepreg thus obtained was 0.2 mm, and the 12 strands were fused with one another to be a single prepreg having a width of 120 mm. In the prepreg thus obtained, the fiber was expanded in the width direction, and the surface was covered with the resin.

The prepreg thus obtained was cut to have a length of 195 mm and the end portion thereof was cut to have a width of 115 mm. This unidirectional prepreg was superposed in the same direction, charged in the mold for press molding 6 that was made of steel and had an outer shape of 230×150×47.5 mm and a cavity of 200×120×1.5 mm at the center (thickness from the upper end of the outer shape 8 to the cavity 7 was 23 mm, thickness from the lower end of the outer shape 8 to the cavity 7 was 23 mm), moved into a press molding machine set at 250° C. together with the mold, hot pressed at 1 MPa for 11 minutes, moved into a press machine set at 30° C. together with the mold, and cold pressed at 4 MPa for 3 minutes to form a unidirectional laminate having a thickness of 2 mm.

The three point bending test was conducted by using one cut out from the laminate in the direction perpendicular to the fiber to have a length of 100 mm and a width of 25 mm and setting the radius of fulcrum to 2 mm, the radius of indenter to 5 mm, the distance between fulcrums to 80 mm, and the test speed to 5 mm per minute, and the direction perpendicular to the fiber axis was adopted as the result for the 90° bending test. In the same manner, one obtained by using one cut out in the direction parallel to the fiber was adopted as the result for the 0° bending test.

Example 9

One prepared by cutting the unidirectional prepreg described in Example 8 to have a length of 195 mm×a width of 115 mm was adopted as 0°, one prepared by arranging two prepregs cut to have a length of 115 mm×a width of 97.5 mm to have a length of 115 mm×a width of 195 mm was adopted as 90°, and eight layers of the cut prepregs were laminated in the order of 0°, 90°, 90°, 0°, 0°, 90°, 90°, and 0°. This was charged in the mold for press molding 6 that was made of steel and had an outer shape of 230×150×47.5 mm and a cavity of 200×120×1.5 mm at the center (thickness from the upper end of the outer shape 8 to the cavity 7 was 23 mm, thickness from the lower end of the outer shape 8 to the cavity 7 was 23 mm), moved into a press molding machine set at 250° C. together with the mold, hot pressed at 1 MPa for 11 minutes, moved into a press machine set at 30° C. together with the mold, and cold pressed at 4 MPa for 3 minutes to form a unidirectional laminate having a thickness of 2 mm.

The three point bending test was conducted by using one cut out from the laminate to have a length of 100 mm and a width of 25 mm and setting the radius of fulcrum to 2 mm, the radius of indenter to 5 mm, the distance between fulcrums to 80 mm, and the test speed to 5 mm per minute. One cut out in the direction parallel to the fiber on the surface was adopted as the result for the 0° bending test and one cut out in the direction perpendicular to the fiber on the surface was adopted as the result for the 90° bending test.

Comparative Example 2

Comparative Example 2 was carried out in the same manner as in Example 8 except that the temperature of the heat medium was 140° C. The polypropylene resin (A-2)

and the carbon fiber (B) were deposited on the roll immediately after the start and a part of the carbon fiber (B) was broken within 5 minutes, and the trial production was thus stopped.

Example 10

Example 10 was carried out in the same manner as in Example 8 except that the nylon resin (A-1) was supplied at a rate of 4.6 kg/h instead of the polypropylene resin (A-2) at 1.1 kg/h and the temperature of the heat medium of the pressure roll 5 was set to 120° C.

Comparative Example 3

The carbon fiber (B) was aligned in one direction and arranged so as to be 75 g/m$^2$, a film of polypropylene resin (A-2) having a thickness of 40 μm was superposed above and below the arranged carbon fiber, the resultant was continuously heated and pressurized at 270° C. using a mold releasing paper, thereby producing a carbon fiber tape. This was used instead of the prepreg in Example 8.

TABLE 1

|  | Example 1 | Example 2 | Example 3 | Example 4 | Example 5 | Example 6 | Example 7 | Comparative Example 1 |
|---|---|---|---|---|---|---|---|---|
| Opening height (mm) | 2.5 | 2.5 | 2.5 | 2.5 | 2.5 | 2.5 | 2.5 | 2.5 |
| Thickness (mm) | 0.3 | 0.4 | 0.2 | 0.2 | 0.3 | 0.3 | 0.3 | 0.6 |
| Thickness/opening height (%) | 12% | 16% | 8% | 8% | 12% | 12% | 12% | 24% |
| Pitch interval (mm) | — | — | — | — | 10 | 10 | 10 | — |
| Nylon resin (A-1) | 41 | 41 | 65 | 64.84 | 69.83 | 69.83 | 69.83 | 41 |
| Carbon fiber (B) | 59 | 59 | 35 | 35 | 30 | 30 | 30 | 59 |
| Mold releasing agent (C) |  |  |  | 0.16 | 0.18 | 0.18 | 0.18 |  |
| Impregnated state | A | B | A | A | A | A | A | C |
| Roll temperature (° C.) | 30 | 30 | 30 | 30 | 30 | 30 | 30 | 30 |
| Release property | B | B | B | A | A | A | A | B |

TABLE 2

|  | Example 5 Unidirectional | Example 6 Cross-laminated | Example 7 25 mm |
|---|---|---|---|
| 0° bending strength (MPa) | 535 | 344 | 303 |
| 0° bending modulus of elasticity (GPa) | 41 | 21 | 22 |
| 90° bending strength (MPa) | 87 | 340 | 321 |
| 90° bending modulus of elasticity (GPa) | 4 | 14 | 13 |

TABLE 3

|  | Example 8 | Example 9 | Comparative Example 2 | Example 10 | Comparative Example 3 |
|---|---|---|---|---|---|
| Opening height (mm) | 2.5 | 2.5 | 2.5 | 2.5 | Film stack method |
| Thickness (mm) | 0.2 | 0.2 | 0.2 | 0.4 |  |
| Thickness/opening height (%) | 8% | 8% | 8% | 16% |  |
| Pitch interval | 10 | 10 | 10 | 10 |  |
| Nylon resin (A-1) |  |  |  | 71.72 |  |
| Polypropylene resin (A-2) | 38 | 38 | 38 |  | 48 |
| Carbon fiber (B) | 62 | 62 | 62 | 28 | 52 |
| Mold releasing agent (C) | — | — | — | 0.18 | — |
| Impregnated state | A | A | A | A | A |
| Roll temperature (° C.) | 110 | 110 | 140 | 120 | — |
| Release property | A | A | C | A | B (Mold releasing paper used) |
| Constitution | Unidirectional | Cross-laminated | Unidirectional | Unidirectional | Unidirectional |
| 0° bending strength (MPa) | 723 | 389 | Unmeasurable | 472 | 624 |
| 0° bending modulus of elasticity (GPa) | 89 | 50 |  | 44 | 77 |
| 90° bending strength (MPa) | 19 | 267 |  | 28 | 13 |
| 90° bending modulus of elasticity (GPa) | 4 | 45 |  | 3 | 2.5 |

The following Examples were carried out by the following methods.

Bending test: a test piece was cut out and subjected to the three point bending test in conformity with ISO 178.

Average value and Cv value of fiber orientation coefficient: the fiber orientation coefficient $\eta_0$ was calculated on the basis of (Equation 1). The bending modulus of elasticity measured was used as the modulus of elasticity E of the composite material. In addition, the volume content percentage of the fiber was calculated on the basis of (Equation 2).

$$E = \eta_0 \cdot E_f V_f + E_m(1-V_f) \quad \text{(Equation 1)}$$

that is, $\eta_0 = (E - E_m(1-V_f))/(E_f V_f)$.

E: modulus of elasticity of composite material (GPa)
Ef: modulus of elasticity of fiber (GPa), 240 in the present Example
Em: modulus of elasticity of resin (GPa), 2 in the present Example
Vf: volume content percentage of fiber (–)
provided that Vf is determined by the following Equation 2.

$$W_f = V_f \rho_f / (V_f \rho_f + (1-V_f)\rho_m) \quad \text{(Equation 2)}$$

Wf: mass content percentage of fiber (–)
ρf: density of fiber (g/cm³), 1.82 in the present Example
μm: density of resin (g/cm³), 1.14 (polyamide) in the present Example The average value and standard deviation of the fiber orientation coefficient thus obtained are determined, and the standard deviation is divided by the average value to calculate the Cv value of the fiber orientation coefficient.

$$Cv \text{ value (\%)} = \text{standard deviation/average value} \times 100 \quad \text{(Equation 3)}$$

External appearance: visually observed and judged as follows.
C: only resin part is conspicuous (diameter: about 1 mm or more)
B: irregularities on surface are conspicuous (height: about 0.1 mm or more)
A: such defects are not present or inconspicuous.

[Raw Materials]

Nylon Resin (A):
(A-1) Nylon 6 Novamid 1007J (manufactured by DSM, low viscosity)
(A-2) Nylon 6 UBE nylon 1015B (manufactured by UBE INDUSTRIES LTD., medium viscosity)

Carbon Fiber (B):
(B-1) PYROFIL CF TOW TR50S 15L (manufactured by Mitsubishi Rayon Co., Ltd., treated with epoxy-based sizing agent, basis weight: 1,000 mg/m, tensile strength: 4,900 MPa, tensile modulus of elasticity: 240 GPa, fiber diameter: 7 μm)
(B-2) PYROFIL chopped fiber TR06NE (manufactured by Mitsubishi Rayon Co., Ltd., treated with nylon-based sizing agent, cutting length: 6 mm, tensile strength: 4,900 MPa, tensile modulus of elasticity: 240 GPa, fiber diameter: 7 μm)

Example 11

The nylon resin (A-1) was supplied to a 30ϕ twin screw extruder by using a metering feeder so that the fiber ratio of the press-molding material was 35%, plasticized at 250° C., supplied to a vertical wire coating die set at 280° C., and composited with the carbon fiber (B-1). The die outlet (outlet opening) has a height of 2.5 mm and a width of 2.5 mm, and the shape of the die is a shape in which a semicircle having a height of 1.25 mm, a width of 2.5 mm, and a diameter of 2.5 mm and a rectangle having a height of 1.25 mm and a width of 2.5 mm are combined in the height direction.

The composite strand was allowed to pass between the two metal pressure rolls 5 which had a diameter of 100 mm and in which water at about 25° C. was circulated to be crushed. The pressurizing force of the pressure roll 5 was adjusted to 50 kgf, and the distance between the pressure rolls was adjusted so as to obtain a strand having a width of about 12 mm. The pressure roll was installed immediately below the die outlet, and the position thereof was adjusted so that upper 40 mm of the center of the two pressure rolls became the die outlet. The pressure roll was driven in the direction to withdraw the strand at a peripheral speed of 19.8 m/min.

This strand was withdrawn at 20 m/min and cut to have a length of 16 mm, thereby obtaining a press-molding material composed of a nylon resin and a carbon fiber. One piece of the press-molding material thus obtained was a substantially rectangular parallelepiped having a length of 16 mm, a width of 12 mm, and a thickness of 0.18 mm. The surface area calculated by regarding this as a rectangular parallelepiped was 394 mm².

A sheet-like press-molding material of 120×200×2 mm was obtained by press molding 70 g of the press-molding material thus obtained by using a steel inlay mold having a rectangular cavity shape of 120×200 mm. The press molding conditions were 4 minutes and 30 seconds at 280° C.×1 MPa, 1 minute at 280° C.×2 MPa, and 2 minutes at 80° C.×2 MPa.

The sheet-like pressed material thus obtained was cut to have a size of 120×100×2 mm and two sheets thereof were superposed at the center of a flat plate-like metal mold of 200×120 mm to charge a sheet-like press-molding material equivalent to 120×100×4 mm. This was subjected to flow press molding to obtain a molded article of 200×120×2 mm. The flow press molding conditions were that heating and cooling press was conducted at 280° C.×1 MPa for 4 minutes and 30 seconds, at 280° C.×2 MPa for 1 minute, and at 80° C.×4 MPa for 2 minutes.

The evaluation results are presented in Table 4.

Example 12

Example 12 was carried out in the same manner as in Example 11 except that the flow press molding was not conducted.

Example 13

Example 13 was carried out in the same manner as in Example 11 except that the nylon resin (A-2) was used and the press-molding material was adjusted so as to have a fiber ratio of 45%, a width of 10 mm, and a length of 25 mm. The thickness of one piece of press-molding material was 0.16 mm.

(Comparative Example 4) Long Fiber Pellet

Comparative Example 4 was carried out in the same manner as in Example 12 except that cooling was conducted by using a water tank instead of two metal pressure rolls to obtain a press-molding material composed of a long fiber pellet. This press-molding material had a substantially cylindrical shape having a length of 16 mm and a diameter of about 2 mm. Press molding and evaluation were conducted in the same manner as in Example 12.

(Comparative Example 5) Short Fiber Pellet

The nylon resin (A-2) was melted by using a 30ϕ twin screw extruder, the carbon fiber (B-2) was supplied thereto from a side feeder, they were melt-kneaded, and a press-molding material composed of a short fiber pellet was obtained by using a water tank and a strand cutter. This press-molding material had a cylindrical shape having a length of 3 mm and a diameter of about 3 mm. Press molding and evaluation were conducted in the same manner as in Example 12.

Example 14

Example 14 was carried out in the same manner as in Example 11 except that the nylon resin (A-2) was used and the press-molding material was adjusted so as to have a fiber ratio of 29%, a width of 12 mm, and a length of 10 mm. The thickness of one piece of the press-molding material was 0.2 mm.

Example 15

Example 15 was carried out in the same manner as in Example 14 except that the press-molding material was adjusted so as to have a length of 15 mm.

Example 16

Example 16 was carried out in the same manner as in Example 14 except that the press-molding material was adjusted so as to have a length of 25 mm.

TABLE 4

| | | Example 11 | Example 12 | Example 13 | Comparative Example 4 | Comparative Example 5 | Example 14 | Example 15 | Example 16 |
|---|---|---|---|---|---|---|---|---|---|
| Raw material | (A-1) | 65 | 65 | | 65 | | | | |
| | (A-2) | | | 55 | | 65 | 71 | 71 | 71 |
| | (B-1) | 35 | 35 | 45 | 35 | | 29 | 29 | 29 |
| | (B-2) | | | | | 35 | | | |
| Manufacturing conditions | Manufacturing method | Drawing method | Drawing method | Drawing method | Drawing method | Melt kneading | Drawing method | Drawing method | Drawing method |
| | Pressure shaping | Subjected | Subjected | Subjected | Not subjected | Not subjected | Subjected | Subjected | Subjected |
| | Flow molding | Subjected | Not subjected | Subjected | Not subjected | Not subjected | Subjected | Subjected | Subjected |
| | Approximate shape | Plate shape | Plate shape | Plate shape | Cylindrical shape | Cylindrical shape | Plate shape | Plate shape | Plate shape |
| | Die height (mm) | 2.5 | 2.5 | 2.5 | 2.5 | 4 | 2.5 | 2.5 | 2.5 |
| | Thickness (mm) | 0.18 | 0.18 | 0.16 | 2 | 3 | 0.2 | 0.2 | 0.2 |
| | Width (mm) | 12 | 12 | 10 | | | 12 | 12 | 12 |
| | Cut length (mm) | 16 | 16 | 25 | 16 | 3 | 10 | 15 | 25 |
| | Thickness/Die height | 7% | 7% | 6% | 80% | 75% | 8% | 8% | 8% |
| | Surface area (mm$^2$) | 394 | 394 | 511 | 107 | 38 | 249 | 371 | 615 |
| | Amount of carbon fiber (%) | 35% | 35% | 45% | 35% | 35% | 29% | 29% | 29% |
| | Vf | 25% | 25% | 34% | 25% | 25% | 20% | 20% | 20% |
| Bending modulus of elasticity (MPa) | Average | 14,289 | 12,427 | 18,475 | 5,414 | 12,616 | 9,730 | 9,090 | 12,470 |
| Bending strength (MPa) | Average | 244 | 189 | 287 | 86 | 174 | 150 | 163 | 216 |
| External appearance | Visual observation | A | A | A | C | B | A | A | A |
| Fiber orientation coefficient | Average value | 0.211 | 0.181 | 0.211 | 0.065 | 0.184 | 0.169 | 0.156 | 0.226 |
| | Cv value | 12.10% | 28.40% | 31.30% | 32.70% | 22.40% | 18.60% | 15.30% | 43.40% |

Examples 10 to 16 are within the scope of the invention and have an excellent bending strength and an excellent external appearance.

In Comparative Example 4, the crushing treatment was not conducted and thus the fibers are not sufficiently dispersed, the press-molding material is inferior in bending strength and bending modulus of elasticity, and only the resin part is conspicuous to be inferior in external appearance.

Comparative Example 5 is a short fiber pellet, and it is thus superior in dispersion to Comparative Example 4 and had a high bending modulus of elasticity, but it is inferior in bending strength to Examples since the fiber is shorter. In addition, there are some reinforcing fibers oriented in the thickness direction, thus the extent of shrinkage varies depending on the location and the irregularities on the surface are conspicuous.

Examples 11 and 13 to 16 subjected to flow molding have a particularly excellent bending strength. Furthermore, in Examples 11, 14 and 15, the length is in the optimum range, thus the variation in fiber orientation coefficient is small and excellent performance can be stably exerted.

INDUSTRIAL APPLICABILITY

In the invention, it is possible to decrease the shear stress as compared to a die having a narrow slit since it is possible to use a crosshead die having a high opening height, and it is thus possible to increase the line speed and to improve the productivity. Furthermore, it is less concerned that the fiber is broken due to clogging of fluff since the crosshead die does not have a narrow slit portion, the restoration in the case of breakage is also easy, and it is thus possible to decrease the production loss. In addition, it is easy to release the composite material from the pressurizing device and it is possible to increase the speed since the composite material is pressurized while being cooled in this production method.

EXPLANATIONS OF LETTERS OR NUMERALS

1: Crosshead die
2: Reinforcing fiber inlet
3: Resin inlet
4: Outlet opening
5: Pressure roll
6: Mold for press molding made of steel
7: Cavity
8: Outer shape

The invention claimed is:

1. A production method for a fiber-reinforced thermoplastic resin composite material, the method comprising:
supplying a reinforcing fiber to a crosshead die having a maximum opening height of 1 mm or more in a reinforcing fiber bundle state,
compositing the reinforcing fiber with a thermoplastic resin in a molten state,
subsequently impregnating the reinforcing fiber with the thermoplastic resin while bringing the composite material into contact with a pressurization surface at a pressure of 5 kgf or more and 50 kgf or less at a temperature equal to or lower than the solidification temperature of the thermoplastic resin, and
shaping the composite material through pressurization to have a thickness to be 20% or less of the opening height.

2. The production method for a fiber-reinforced thermoplastic resin composite material according to claim 1, wherein a reinforced fiber bundle having a basis weight of 800 mg/m or more and 5000 mg/m or less is used.

3. The production method for a fiber-reinforced thermoplastic resin composite material according to claim 2, wherein a basis weight R (mg/m) of the reinforcing fiber bundle with respect to the maximum opening height L is represented by $$L > 0.5 \times \mathrm{Log}(R).$$

4. The production method for a fiber-reinforced thermoplastic resin composite material according to claim 1, wherein adjacent fiber-reinforced thermoplastic resin composite materials are integrated through pressurization using the crosshead die having a plurality of openings with a pitch interval of 5 mm or more and 40 mm or less.

5. The production method for a fiber-reinforced thermoplastic resin composite material according to claim 1, wherein the reinforcing fiber and the thermoplastic resin in the molten state are composited in the crosshead die having an opening with the maximum height of 1 mm or more and 10 mm or less and subsequently shaped to have an average thickness of 0.05 mm or more and 0.4 mm or less by being pressurized.

6. The production method for a fiber-reinforced thermoplastic resin composite material according to claim 1, wherein the reinforcing fiber and the thermoplastic resin are composited at 10% by mass or more and 70% by mass or less and 30% by mass or more and 90% by mass or less respectively.

7. The production method for a fiber-reinforced thermoplastic resin composite material according to claim 1, wherein the outlet opening height of the crosshead die is 1.5 mm or more.

8. The production method for a fiber-reinforced thermoplastic resin composite material according to claim 1, wherein the reinforcing fiber is impregnated with the thermoplastic resin by contacting a pressure surface and applying pressure.

9. The production method for a fiber-reinforced thermoplastic resin composite material according to claim 1, wherein the opening runs vertically.

10. The production method for a fiber-reinforced thermoplastic resin composite material according to claim 1, wherein the opening is an outlet, which is located at a bottom of the crosshead die.

11. The production method for a fiber-reinforced thermoplastic resin composite material according to claim 1, wherein the reinforcing fiber and the thermoplastic resin are composited at 10% by mass or more and 60% by mass or less and 40% by mass or more and 90% by mass or less respectively.

12. The production method for a fiber-reinforced thermoplastic resin composite material according to claim 1, wherein the reinforcing fiber and the thermoplastic resin are composited at 15% by mass or more and 49% by mass or less and 51% by mass or more and 85% by mass or less respectively.

13. A production method for a fiber-reinforced thermoplastic resin tape, the method comprising cutting the fiber-reinforced thermoplastic resin composite material obtained by the production method according to claim 1 to have a length of 100 mm or more.

14. The production method for a fiber-reinforced thermoplastic resin tape according to claim 13, wherein the reinforcing fiber and the thermoplastic resin are composited at 20% by mass or more and 70% by mass or less and 30% by mass or more and 80% by mass or less respectively.

15. A production method for a press-molding material, the method comprising cutting the fiber-reinforced thermoplastic resin composite material obtained by the production method according to claim 1 to have a length of 5 mm or more and 50 mm or less.

16. The production method for a press-molding material according to claim 15, wherein the reinforcing fiber and the thermoplastic resin are composited at 10% by mass or more and 60% by mass or less and 40% by mass or more and 90% by mass or less respectively.

17. A production method for a press-molding material, the method comprising integrating the press-molding material obtained by the production method according to claim 15 into a sheet shape through heating.

18. A production method for a molded article, wherein the molded article is obtained by heating the press-molding material according to claim 15 at a temperature equal to or higher than the softening temperature of a thermoplastic resin and then flow press molding the press-molding material, and
a Cv value of an in-plane fiber orientation coefficient is 20% or less.

\* \* \* \* \*